United States Patent
Yamashita et al.

(10) Patent No.: US 11,736,040 B2
(45) Date of Patent: Aug. 22, 2023

(54) ULTRASONIC MOTOR WITH IMPROVED ROTATION EFFICIENCY

(71) Applicant: Murata Manufacturing Co., Ltd., Nagaokakyo (JP)

(72) Inventors: Toshiaki Yamashita, Nagaokakyo (JP); Tsuguji Kambayashi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/661,451

(22) Filed: Apr. 29, 2022

(65) Prior Publication Data

US 2022/0263431 A1    Aug. 18, 2022

Related U.S. Application Data

(63) Continuation of application No. PCT/JP2020/041365, filed on Nov. 5, 2020.

(30) Foreign Application Priority Data

Nov. 15, 2019    (JP) .................................. 2019-206729

(51) Int. Cl.
  *H02N 2/10*    (2006.01)
  *H02N 2/00*    (2006.01)
  *H02N 2/12*    (2006.01)

(52) U.S. Cl.
  CPC ............. *H02N 2/103* (2013.01); *H02N 2/001* (2013.01); *H02N 2/12* (2013.01)

(58) Field of Classification Search
  None
  See application file for complete search history.

(56) References Cited

U.S. PATENT DOCUMENTS

| 5,532,541 A * | 7/1996 | Fujishima | H02N 2/004 310/323.12 |
| 2006/0284517 A1* | 12/2006 | Unno | H02N 2/166 310/323.03 |
| 2009/0134744 A1 | 5/2009 | Yoon et al. | |

FOREIGN PATENT DOCUMENTS

| JP | S62260567 A | 11/1987 |
| JP | 2002142473 A | 5/2002 |
| JP | 2009131145 A | 6/2009 |

OTHER PUBLICATIONS

International Search Report issued in PCT/JP2020/041365, dated Jan. 26, 2021.

* cited by examiner

*Primary Examiner* — Emily P Pham
(74) *Attorney, Agent, or Firm* — ArentFox Schiff LLP

(57) ABSTRACT

An ultrasonic motor is provided that includes a stator having a vibrator and first to fourth piezoelectric elements, a rotor, and a wiring member including an insulating substrate and first and second wirings. The piezoelectric elements are dispersedly arranged along the circumferential direction of a traveling wave circulating around an axial direction so that the traveling wave is generated by the vibrator being vibrated. The first and third piezoelectric elements face each other across the center of a traveling wave. The first wiring is electrically connected to the first and third piezoelectric elements, and the second wiring is electrically connected to the second and fourth piezoelectric elements. The second wiring passes over the third piezoelectric element from the second piezoelectric element side and extends toward the side of fourth piezoelectric element.

20 Claims, 8 Drawing Sheets

ULTRASONIC MOTOR WITH IMPROVED ROTATION EFFICIENCY

CROSS REFERENCE TO RELATED APPLICATIONS

This application is a continuation of PCT Application No. PCT/JP2020/041365, filed Nov. 5, 2020, which claims priority to Japanese Patent Application No. 2019-206729, filed Nov. 15, 2019, the entire contents of each of which are hereby incorporated in their entirety.

TECHNICAL FIELD

The present invention relates to an ultrasonic motor including a plurality of piezoelectric elements.

BACKGROUND ART

Conventionally, there are various ultrasonic motors that vibrate a stator by a piezoelectric element. For example, in a vibration wave motor described in Japanese Patent Application Laid-Open No. 2002-142473 (hereinafter "Patent Literature 1"), a plurality of piezoelectric elements is attached to an elastic body. In order to transmit signals to the plurality of the piezoelectric elements, a flexible printed circuit board (FPC) is used. The FPC includes multiple layers. Accordingly, transmission of two-phase signals is enabled.

However, when a multi-layered FPC is used, vibration energy is easily absorbed, and vibration efficiency may be deteriorated. Therefore, rotation efficiency of a motor may also be deteriorated. On the other hand, when signals are transmitted to a plurality of piezoelectric elements and two-phase signals are transmitted using a single-layered FPC, there is an increased possibility that a short circuit occurs, and there is also a possibility that wiring gets complicated.

SUMMARY OF THE INVENTION

Accordingly, it is an object of the present invention to provide an ultrasonic motor that improves vibration efficiency of a vibrator and improves rotation efficiency.

In an exemplary aspect, an ultrasonic motor is provided that includes a stator having a plate-shaped vibrator with a first main surface and a second main surface that face each other, and a plurality of piezoelectric elements provided on the first main surface of the vibrator. Moreover, a rotor is in direct or indirect contact with the second main surface of the vibrator, and a wiring member including an insulating substrate is provided on the first main surface of the vibrator. First and second wirings are provided on the insulating substrate, in which when a direction that connects the first main surface to the second main surface of the vibrator and is along a rotation center is an axial direction, the plurality of the piezoelectric elements is dispersedly arranged along a circumferential direction of a traveling wave circulating around the axial direction so that the traveling wave is generated by the vibrator being vibrated. In addition, the plurality of the piezoelectric elements includes a first piezoelectric element, a second piezoelectric element, a third piezoelectric element, and a fourth piezoelectric element, and when viewed from the axial direction, the first piezoelectric element and the third piezoelectric element face each other across a center of the traveling wave, and the second piezoelectric element and the fourth piezoelectric element face each other across the center of the traveling wave. The first wiring of the wiring member is electrically connected to the first piezoelectric element and the third piezoelectric element, and the second wiring is electrically connected to the second piezoelectric element and the fourth piezoelectric element, and when viewed from the axial direction, the second wiring passes over the third piezoelectric element from the second piezoelectric element side and extends toward the fourth piezoelectric element side.

According to an ultrasonic motor of the present invention, vibration efficiency of a vibrator is improved and rotation efficiency is improved.

DETAILED DESCRIPTION

Hereinafter, the present invention will be clarified by specific exemplary embodiments of the present invention being described with reference to the drawings.

It is noted that the embodiments described in the present specification are exemplary, and replacement or combination of some parts of configurations is possible between different embodiments as would be appreciated to one skilled in the art.

Figure 1:
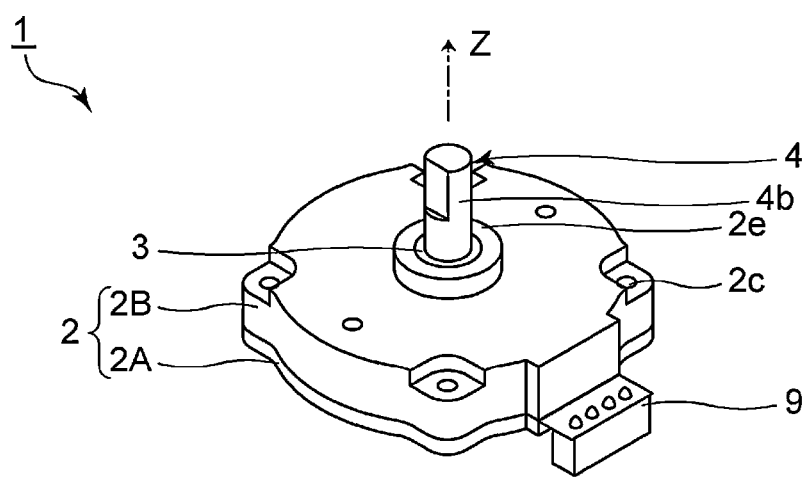
FIG. 1 is a perspective view of an ultrasonic motor according to a first exemplary embodiment.
Figure 2:
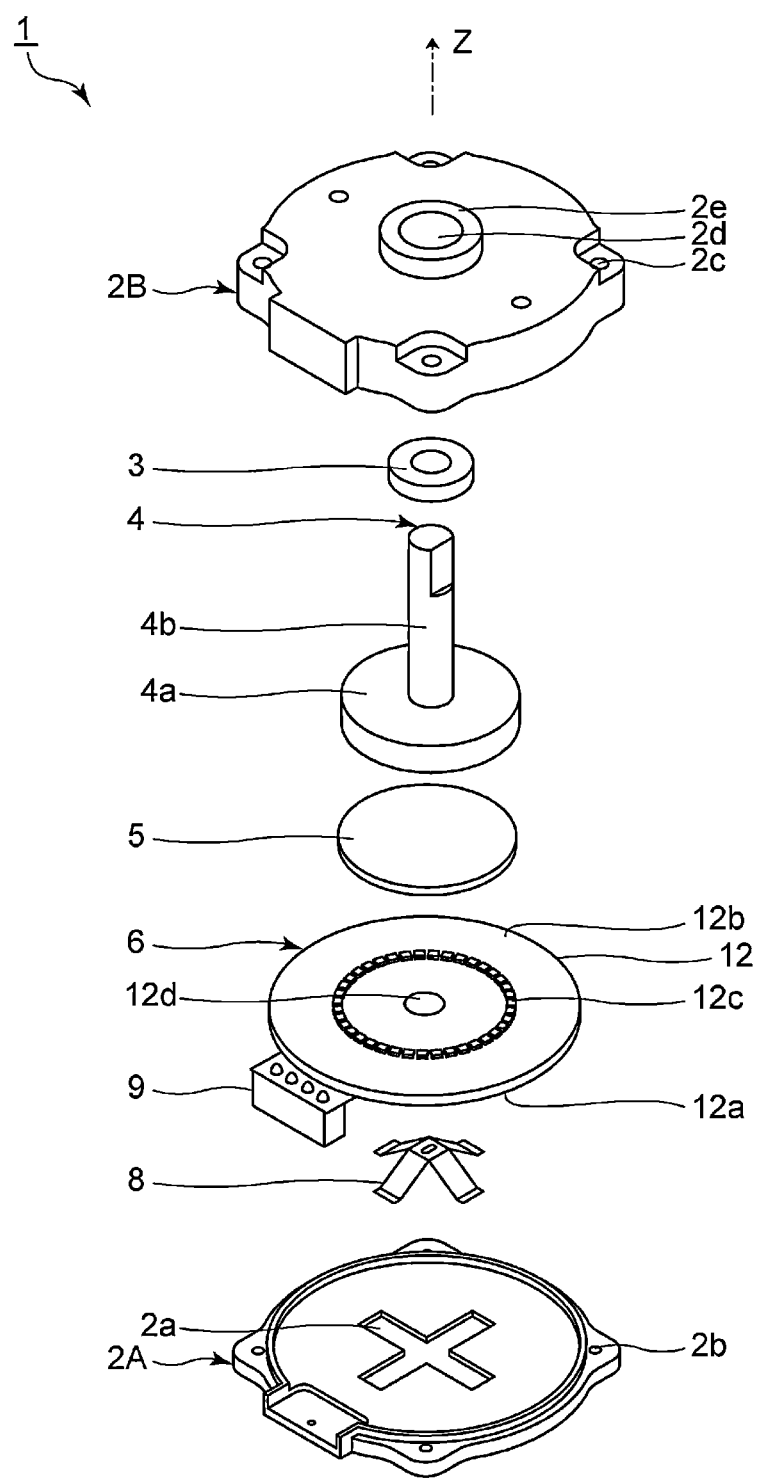
FIG. 2 is an exploded perspective view of the ultrasonic motor according to the first exemplary embodiment.

FIG. 1 is a perspective view of an ultrasonic motor according to a first exemplary embodiment. FIG. 2 is an exploded perspective view of the ultrasonic motor according to the first exemplary embodiment.

As illustrated in FIG. 1, an ultrasonic motor 1 includes a first case member 2A and a second case member 2B that is fixed on (or to) the first case member 2A to form a case 2. As illustrated in FIG. 2, a bearing 3, a rotor 4, a friction material 5, a stator 6, and a pressure spring 8 are provided inside the case 2. The stator 6 includes a vibrator 12. In the ultrasonic motor 1, a traveling wave circulating around an axial direction Z illustrated in FIG. 2 is generated by the vibrator 12 of the stator 6 being vibrated. In turn, the rotor 4 is rotated by the traveling wave.

Here, the vibrator 12 of the stator 6 includes a first main surface 12a and a second main surface 12b. The first main surface 12a and the second main surface 12b face each other. In the present disclosure, the axial direction Z is a direction that connects the first main surface 12a to the second main surface 12b and is along the rotation center.

Figure 3:
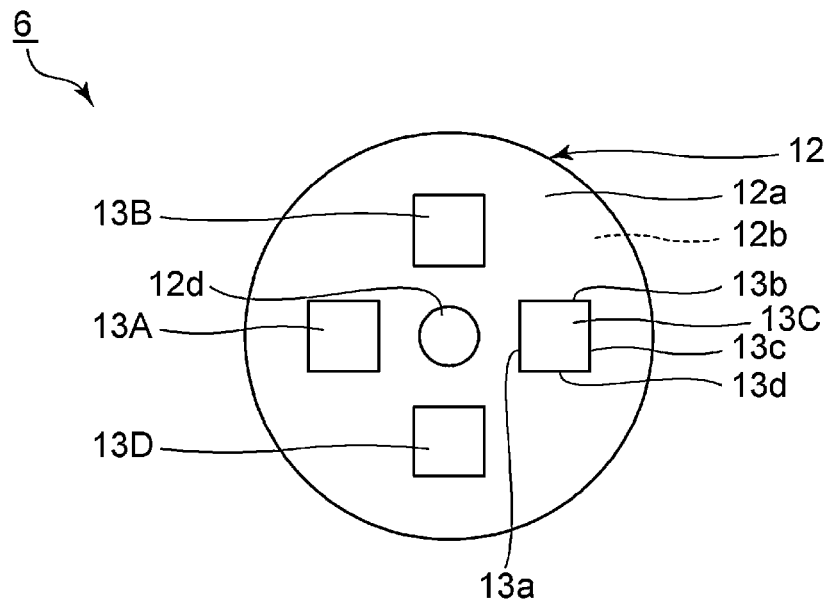
FIG. 3 is a bottom view of a stator according to the first exemplary embodiment.

FIG. 3 is a bottom view of the stator according to the first embodiment.

As shown, the stator 6 includes a plurality of piezoelectric elements. In the present embodiment, the plurality of the piezoelectric elements includes a first piezoelectric element 13A, a second piezoelectric element 13B, a third piezoelectric element 13C, and a fourth piezoelectric element 13D. The plurality of the piezoelectric elements is provided on the first main surface 12a of the vibrator 12. More specifically, the plurality of the piezoelectric elements is attached to the vibrator 12 using an adhesive, which can be, for example, an epoxy resin, a polyethylene resin, or the like.

The plurality of the piezoelectric elements is dispersedly arranged along the circumferential direction of a traveling wave circulating around the axial direction Z so that the traveling wave is generated. When viewed from the axial direction Z, the first piezoelectric element 13A and the third piezoelectric element 13C face each other across the center of a traveling wave. Similarly, the second piezoelectric element 13B and the fourth piezoelectric element 13D face each other across the center of a traveling wave.

In the present embodiment, the center of a traveling wave corresponds to the center of the stator 6 and the center of the vibrator 12. However, the center of a traveling wave may not necessarily correspond to the center of the stator 6 and the center of the vibrator 12 in an alternative aspect.

As illustrated in FIG. 3, when viewed from the axial direction Z, the third piezoelectric element 13C has a rectangular shape, and includes a first side 13a, a second side 13b, a third side 13c, and a fourth side 13d that are outer peripheral edges of the third piezoelectric element 13C. The first side 13a and the third side 13c face each other and the second side 13b and the fourth side 13d face each other. Here, in the present disclosure, the outer side and the inner side are respectively defined as a side farther from the axis and a side closer to the axis when viewed from the axial direction Z unless otherwise specified. The first side 13a is positioned on the inner side relative to the third side 13c. The second side 13b and the fourth side 13d extend from the inner side to the outer side. The first piezoelectric element 13A, the second piezoelectric element 13B, and the fourth piezoelectric element 13D also include first to fourth sides similarly to the third piezoelectric element 13C as described herein.

Moreover, the plurality of the piezoelectric elements is electrically connected to a wiring member, which in turn is electrically connected to a connector 9 illustrated in FIG. 1. More particularly, the plurality of the piezoelectric elements is electrically connected to the outside with the wiring member and the connector 9 interposed therebetween.

Hereinafter, the features of the present embodiment will be described together with the details of a wiring member 7.

Figure 4:
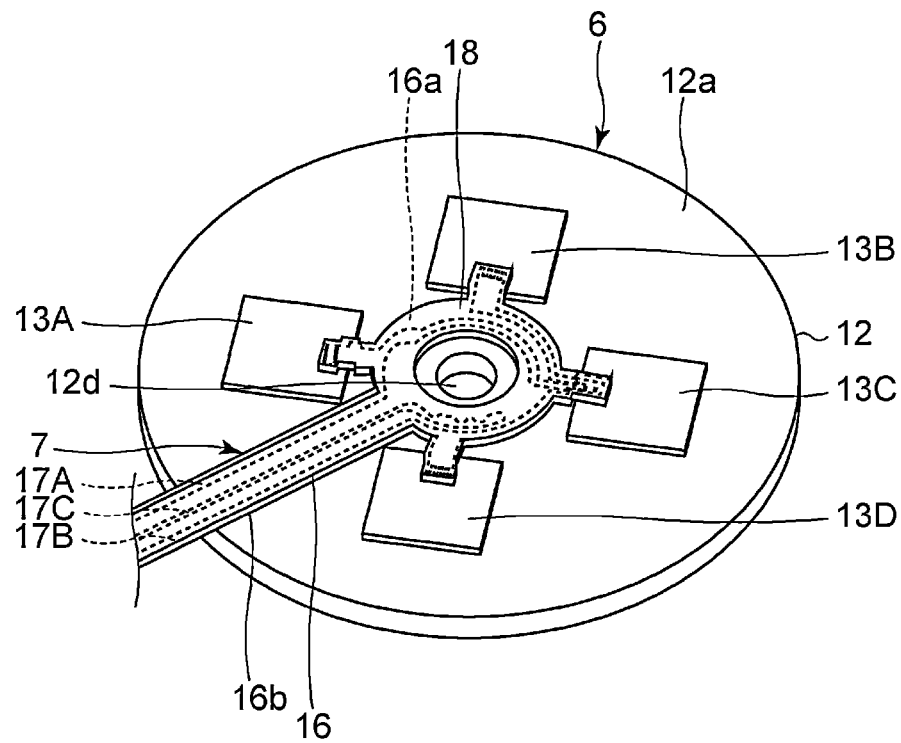
FIG. 4 is a perspective view of the stator and a wiring member according to the first exemplary embodiment.
Figure 5:
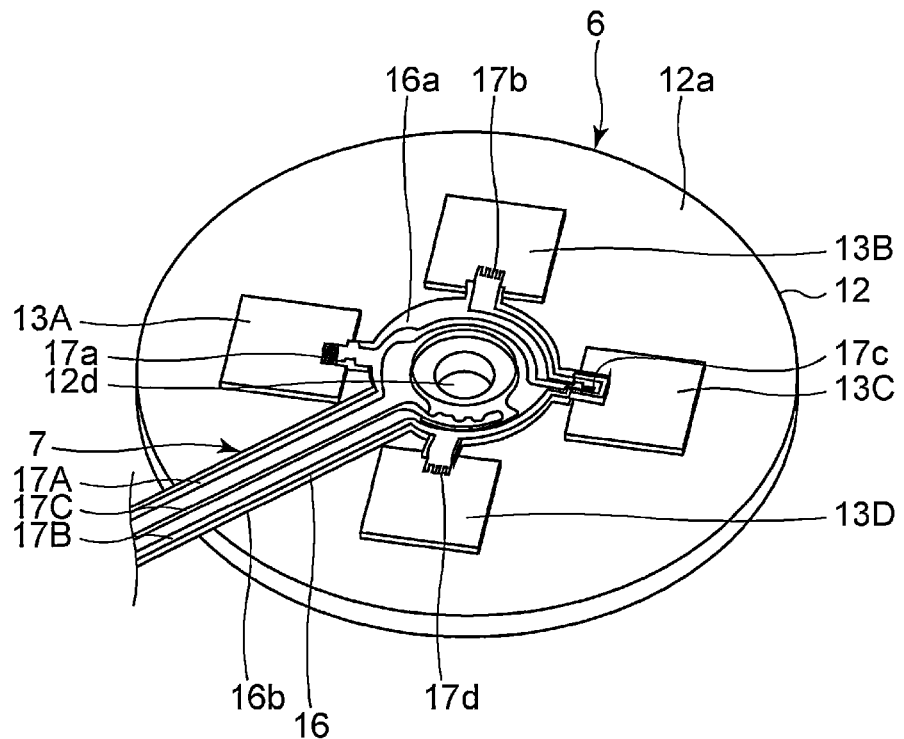
FIG. 5 is a perspective view illustrating the stator and the wiring member according to the first exemplary embodiment without an insulating cover.

Specifically, FIG. 4 is a perspective view of the stator and the wiring member according to the first embodiment. FIG. 5 is a perspective view illustrating the stator and the wiring member according to the first embodiment without an insulating cover. Note that the insulating cover will be described below.

As illustrated in FIGS. 4 and 5, the wiring member 7 includes an insulating substrate 16 provided on the first main surface 12a of the vibrator 12. The insulating substrate 16 includes a first substrate main surface 16a and a second substrate main surface 16b that face each other. The second substrate main surface 16b is a surface on the vibrator 12. On the first substrate main surface 16a of the insulating substrate 16, first wiring 17A and second wiring 17B are provided. As described above, the insulating substrate 16 is provided between the vibrator 12 and both the first wiring 17A and the second wiring 17B. Accordingly, the first wiring 17A and the second wiring 17B are electrically insulated from the vibrator 12.

Furthermore, as illustrated in FIG. 5, the wiring member 7 includes ground wiring 17C. The ground wiring 17C includes a portion provided on the first substrate main surface 16a of the insulating substrate 16 and a portion provided on the first main surface 12a of the vibrator 12. In the present embodiment, the vibrator 12 is formed from metal. Moreover, the ground wiring 17C is electrically connected to the vibrator 12. More specifically, the ground wiring 17C is connected to the vibrator 12 at a portion positioned on the inner side relative to the first wiring 17A. The ground wiring 17C is electrically connected to ground potential with the vibrator 12 interposed therebetween. It is noted that the position of the ground wiring 17C is not limited to the above. The first wiring 17A, the second wiring 17B, and the ground wiring 17C are connected to the above connector 9.

As illustrated in FIG. 4, the wiring member 7 includes an insulating cover 18 that covers the first wiring 17A, the second wiring 17B, the ground wiring 17C, and the first substrate main surface 16a of the insulating substrate 16. It is also noted that the insulating cover 18 at least covers the first wiring 17A and the second wiring 17B and that it can extend over the plurality of the piezoelectric elements or the vibrator 12 in an exemplary aspect.

For the first wiring 17A, the second wiring 17B, and the ground wiring 17C, for example, copper foil or the like can be used. However, the material of the first wiring 17A, the second wiring 17B, and the ground wiring 17C is not limited to the above, and appropriate metal can be used. For example, polyimide can be used for the insulating substrate 16 and the insulating cover 18. However, the material of the insulating substrate 16 and the insulating cover 18 is not limited to the above, and appropriate insulating material can be used.

Figure 6:
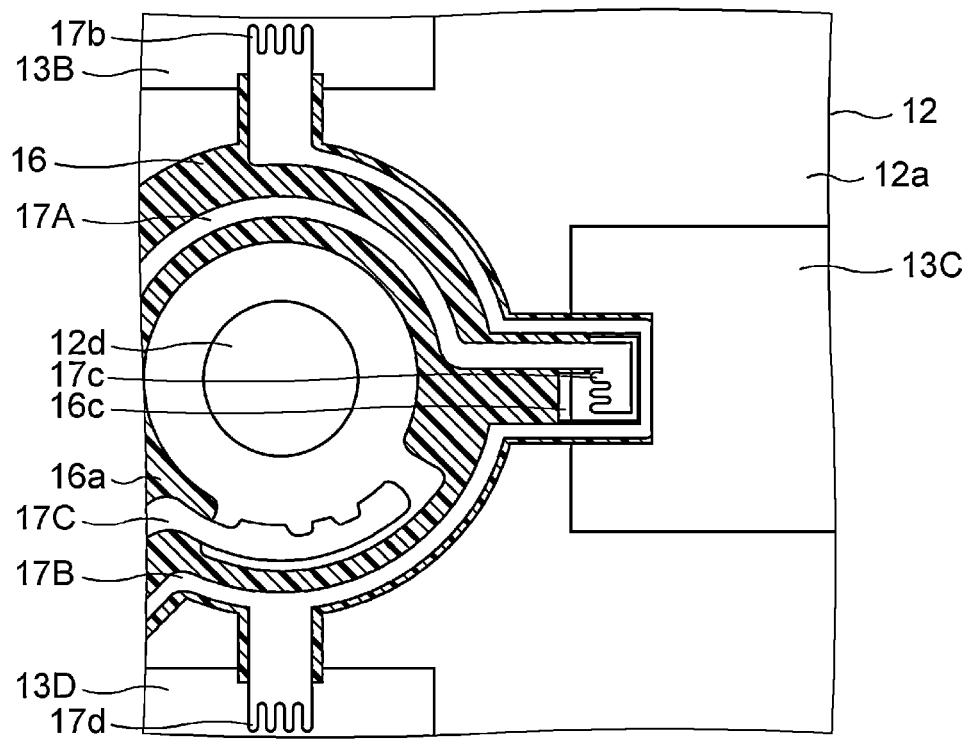
FIG. 6 is a plan view illustrating the vicinity of a portion where a third piezoelectric element is connected to first wiring according to the first exemplary embodiment without the insulating cover.
Figure 7:
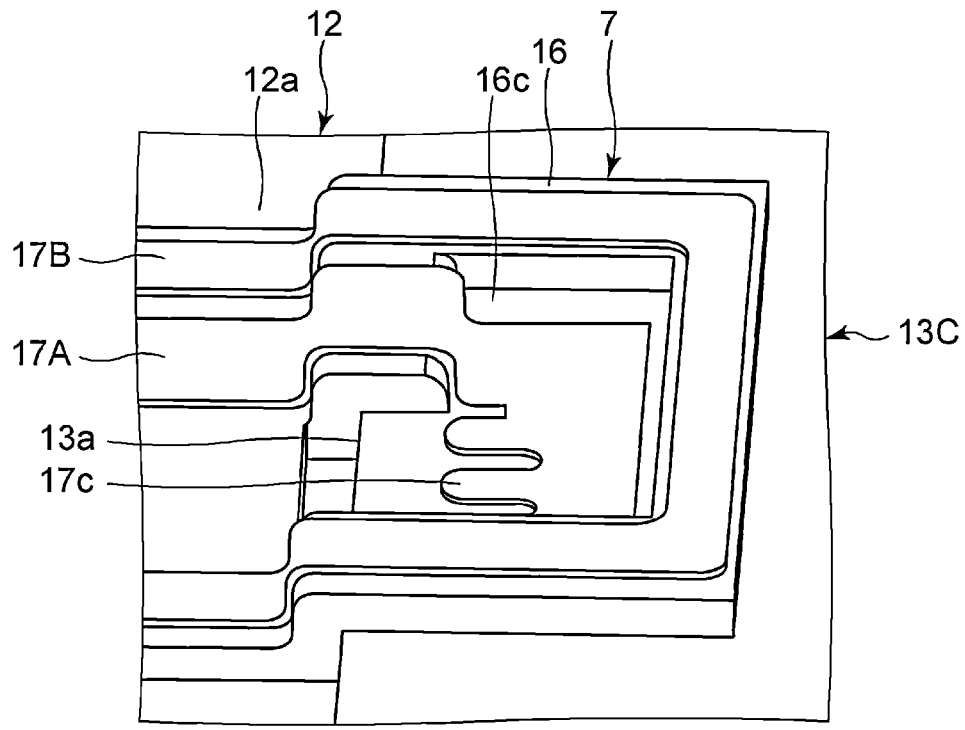
FIG. 7 is a perspective view illustrating the vicinity of the portion where the third piezoelectric element is connected to the first wiring according to the first exemplary embodiment without the insulating cover.

FIG. 6 is a plan view illustrating the vicinity of a portion where the third piezoelectric element is connected to the first wiring according to the first embodiment without the insulating cover. FIG. 7 is a perspective view illustrating the vicinity of the portion where the third piezoelectric element is connected to the first wiring according to the first embodiment without the insulating cover. In FIG. 6, the insulating substrate 16 is indicated using hatching.

As illustrated in FIGS. 5 and 6, the first wiring 17A of the wiring member 7 is electrically connected to the first piezoelectric element 13A and the third piezoelectric element 13C. More specifically, as illustrated in FIG. 5, a portion of the first wiring 17A connected to the first piezoelectric element 13A is not provided on the insulating substrate 16 of the wiring member 7. Similarly, as illustrated in FIG. 6, a portion of the first wiring 17A connected to the third piezoelectric element 13C is not provided on the insulating substrate 16 of the wiring member 7. More specifically, as illustrated in FIG. 7, the insulating substrate 16 includes a cavity 16c. When viewed from the axial direction Z, the cavity 16c is positioned on the third piezoelectric element 13C. The portion of the first wiring 17A connected to the third piezoelectric element 13C is positioned in the cavity 16c. On the other hand, the first wiring 17A is not electrically connected to the second piezoelectric element 13B or the fourth piezoelectric element 13D.

Returning to FIG. 6, the second wiring 17B is electrically connected to the second piezoelectric element 13B and the fourth piezoelectric element 13D. More specifically, a portion of the second wiring 17B connected to the second piezoelectric element 13B and a portion of the second wiring 17B connected to the fourth piezoelectric element 13D are not provided on the insulating substrate 16 of the wiring member 7. On the other hand, the second wiring 17B is not electrically connected to the first piezoelectric element 13A or the third piezoelectric element 13C.

When viewed from the axial direction Z, the second wiring 17B passes over the third piezoelectric element 13C from the second piezoelectric element 13B side and extends toward the fourth piezoelectric element 13D side. Moreover, the insulating substrate 16 is provided between the second wiring 17B and the third piezoelectric element 13C.

The first wiring 17A is bonded to the first piezoelectric element 13A and the third piezoelectric element 13C using an adhesive. Similarly, the second wiring 17B is bonded to the second piezoelectric element 13B and the fourth piezoelectric element 13D using an adhesive. As the adhesive, for example, an epoxy resin, a polyethylene resin, or the like can be used. However, the material of the adhesive is not limited to the above. The form in which the first wiring 17A and the second wiring 17B are bonded to corresponding piezoelectric elements is not limited to the above, and, for example, solder or the like may be used for the bonding in alternative aspects.

As illustrated in FIG. 5, in the present embodiment, the portion of the first wiring 17A connected to the first piezoelectric element 13A includes a first comb-shaped portion 17a. Similarly, the portion of the second wiring 17B connected to the second piezoelectric element 13B includes a second comb-shaped portion 17b. The portion of the first wiring 17A connected to the third piezoelectric element 13C includes a third comb-shaped portion 17c. The portion of the second wiring 17B connected to the fourth piezoelectric element 13D includes a fourth comb-shaped portion 17d. When viewed in the axial direction Z, the first comb-shaped portion 17a, the second comb-shaped portion 17b, and the fourth comb-shaped portion 17d are comb-shaped portions that face the outer side. On the other hand, when viewed in the axial direction Z, the third comb-shaped portion 17c is a comb-shaped portion that faces the inner side. It is noted that when viewed in the axial direction Z, the first comb-shaped portion 17a, the second comb-shaped portion 17b, the third comb-shaped portion 17c, and the fourth comb-shaped portion 17d can face the inner side or the outer side in various exemplary aspects. Moreover, the first wiring 17A and the second wiring 17B do not necessarily include above corresponding comb-shaped portions.

As described above, present embodiment provides that, when viewed from the axial direction Z, the second wiring 17B passes over the third piezoelectric element 13C from the second piezoelectric element 13B side and extends toward the fourth piezoelectric element 13D side. As a result of this configuration, wiring can be routed by the wiring member 7 in which the wiring is in a single layer. Accordingly, the vibration efficiency of the vibrator 12 is improved, and the rotation efficiency of the ultrasonic motor 1 is improved. Furthermore, since the wiring member 7 does not necessarily include multiple layers, the productivity is also improved.

As illustrated in FIGS. 6 and 7, the insulating substrate 16 includes the cavity 16c, and the cavity 16c of the insulating substrate 16 preferably includes a part of an outer peripheral edge of the third piezoelectric element 13C when viewed from the axial direction Z. More specifically, for example, as in the present embodiment, the cavity 16c preferably includes the first side 13a as a part of an outer peripheral edge of the third piezoelectric element 13C. In this case, the area of the inner portion of the cavity 16c when viewed from the axial direction Z can be effectively increased. Accordingly, an excessive adhesive can be effectively and easily discharged from a gap between the first wiring 17A and the third piezoelectric element 13C to the outside of the surface of the piezoelectric element without the routing of the second wiring 17B lengthened. As a result, generation of a lump of an adhesive between the first wiring 17A and the third piezoelectric element 13C can be prevented. Furthermore, since an adhesive between the first wiring 17A and the third piezoelectric element 13C can be prevented from being too thick, air bubbles are hardly formed in the adhesive between the first wiring 17A and the third piezoelectric element 13C. Accordingly, stress concentration on a lump of an adhesive due to a temperature change hardly occurs, and thus the first wiring 17A can be effectively and hardly disconnected. In this manner, reliability against heat shock can also be improved.

As in the present embodiment, the first wiring 17A preferably includes the first comb-shaped portion 17a and the third comb-shaped portion 17c. Accordingly, the first piezoelectric element 13A and the third piezoelectric element 13C can be easily bonded to the insulating cover 18 also at portions where the first wiring 17A is bonded to the first piezoelectric element 13A and the third piezoelectric element 13C. Similarly, the second wiring 17B preferably includes the second comb-shaped portion 17b and the fourth comb-shaped portion 17d. Accordingly, the second piezoelectric element 13B and the fourth piezoelectric element 13D can be easily bonded to the insulating cover 18 also at portions where the second wiring 17B is bonded to the second piezoelectric element 13B and the fourth piezoelectric element 13D.

Moreover, the third comb-shaped portion 17c of the first wiring 17A preferably has a comb shape and faces the inner side as shown in FIG. 6, for example. In other words, the third comb-shaped portion 17c of the first wiring 17A preferably has a comb shape and faces an outer peripheral edge of the third piezoelectric element 13C, that is, the first side 13a. In this case, when an excessive adhesive is discharged from a gap between the first wiring 17A and the third piezoelectric element 13C to the outside of the surface of the piezoelectric element, the adhesive is easily discharged toward the inner side when viewed from the axial direction Z. As a result, although the distance between a portion of the second wiring 17B positioned on the outer side relative to the first wiring 17A and the third comb-shaped portion 17c of the first wiring 17A may be short, the above adhesive can be easily discharged to the outside of the surface of the piezoelectric element. Accordingly, an adhesive can be more easily discharged from the gap between the first wiring 17A and the third piezoelectric element 13C to the outside of the surface of the piezoelectric element without the routing of the second wiring 17B lengthened.

Figure 8:
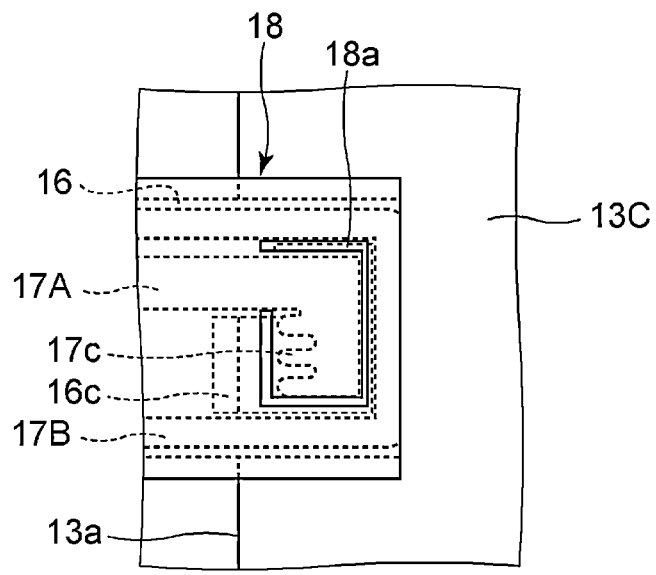
FIG. 8 is a plan view illustrating the vicinity of the portion where the third piezoelectric element is connected to the first wiring according to the first exemplary embodiment.

FIG. 8 is a plan view illustrating the vicinity of the portion where the third piezoelectric element is connected to the first wiring according to the first embodiment.

As shown, the insulating cover 18 includes a cutout portion 18a. When viewed from the axial direction Z, the cutout portion 18a is positioned on the inner side of the cavity 16c. The cutout portion 18a surrounds a portion of the first wiring 17A connected to the third piezoelectric element 13C. On the third piezoelectric element 13C, the cutout portion 18a is positioned between a portion of the insulating cover 18 that covers the first wiring 17A and a portion of the insulating cover 18 that covers the second wiring 17B. Accordingly, both the first wiring 17A and the second wiring 17B and the insulating cover 18 can be more reliably brought into close contact with each other although there may be a height difference between the surfaces of the first wiring 17A and the second wiring 17B on the insulating cover 18 side. However, the insulating cover 18 may not include the cutout portion 18a in an alternative aspect.

The first wiring 17A preferably passes through a portion of the insulating substrate 16 that extends over the third piezoelectric element 13C, and extends over the third piezoelectric element 13C. In this case, the first wiring 17A can be electrically connected to the third piezoelectric element 13C while the first wiring 17A is electrically insulated from the vibrator 12 more reliably. Similarly, as illustrated in FIG. 5, the first wiring 17A preferably passes through a portion of the insulating substrate 16 that extends over the first piezoelectric element 13A, and extends over the first piezoelectric element 13A. As illustrated in FIG. 6, the second wiring 17B preferably passes through a portion of the insulating substrate 16 that extends over the second piezoelectric element 13B, and extends over the second piezoelectric element 13B. Furthermore, the second wiring 17B preferably passes through a portion of the insulating substrate 16 that extends over the fourth piezoelectric element 13D, and extends over the fourth piezoelectric element 13D.

In the present embodiment, the plurality of the piezoelectric elements is four piezoelectric elements. However, it is noted that the present embodiment is not limited to this number, and the plurality of the piezoelectric elements can be 4× piezoelectric elements, where x is a positive number of one or more. When the number of the plurality of the piezoelectric elements is more than four, the insulating substrate 16 preferably includes two or more of cavities 16c in such exemplary embodiments.

In the wiring member 7, for example, a driving wiring pattern may be provided on the first substrate main surface 16a of the insulating substrate 16, and a detection pattern may be provided on the second substrate main surface 16b. The detection pattern is a wiring pattern included in a circuit that detects vibration of the piezoelectric elements. As described above, two layers of wiring patterns may be used in the wiring member 7.

Hereinafter, other configurations of the ultrasonic motor 1 will be described in detail.

As illustrated in FIG. 2, the above rotor 4 includes a disk-shaped rotor body 4a and a rotating shaft 4b including one end connected to the rotor body 4a. The rotor 4 is rotated, and the rotating shaft 4b is rotated accordingly. Note that the shape of the rotor body 4a is not limited to the above and the shape of the rotor body 4a viewed from the axial direction Z can be, for example, a regular polygon such as a regular hexagon, a regular octagon, or a regular decagon in various exemplary aspects.

In FIG. 2, the friction material 5 is fixed to the lower surface of the rotor body 4a of the rotor 4, and is provided for increasing the frictional force between the rotor 4 and the vibrator 12. Note that, although the rotor 4 is in indirect contact with the second main surface 12b of the vibrator 12 with the friction material 5 interposed therebetween in the present embodiment, the friction material 5 is not necessarily provided. In this case, the rotor 4 may be in direct contact with the second main surface 12b of the vibrator 12 in an alternative aspect.

Moreover, a cross-shaped recessed portion 2a is provided on the upper surface of the first case member 2A. The pressure spring 8 is provided as a pressure member between the first main surface 12a of the vibrator 12 and the first case member 2A. The pressure spring 8 has a cross shape in a plan view, and the tips of the cross-shaped portion are fitted in the cross-shaped portion of the recessed portion 2a. Accordingly, the pressure spring 8 is not rotated centering around the axial direction, and the center of the axis and the center of the spring are aligned with each other.

The pressure spring 8 applies pressure to bring the vibrator 12 into pressure contact with the rotor 4 side. In order to apply this pressure, the first case member 2A is fixed to the second case member 2B, and the above pressure is applied using the resilient force of the pressure spring 8.

For fixing the first case member 2A to the second case member 2B, for example, appropriate fixing structure, such as a method in which a bolt inserted through a through hole 2b and a through hole 2c and a nut, are used can be used.

A cylindrical protruding portion 2e including the through hole 2d is provided at the center of the second case member 2B. The bearing 3 is housed in the through hole 2d, and the rotating shaft 4b is inserted through the through hole of the bearing 3.

As illustrated in FIG. 2, the above vibrator 12 of the stator 6 is disk-shaped. In the vibrator 12, a through hole 12d is provided at the central portion. Note that, the shape of the vibrator 12 viewed from the axial direction Z is not limited to a disk shape, and may be, for example, a regular polygon such as a regular hexagon, a regular octagon, or a regular decagon. The vibrator 12 may not include the through hole 12d. The vibrator 12 is only required to be plate-shaped.

In addition, a plurality of protrusions 12c is provided on the second main surface 12b of the vibrator 12. The plurality of the protrusions 12c is portions of the vibrator 12 in contact with the friction material 5. When the friction material 5 is not provided, the plurality of the protrusions 12c is in contact with the rotor body 4a of the rotor 4. Each of the protrusions 12c protrudes in the axial direction Z from the second main surface 12b of the vibrator 12. When viewed from the axial direction Z, the plurality of the protrusions 12c is arranged annularly. Since the plurality of the protrusions 12c protrudes from the second main surface 12b in the axial direction Z, the tips of the plurality of the protrusions 12c are displaced more greatly when a traveling wave is generated in the vibrator 12. Accordingly, the rotor 4 can be efficiently rotated by a traveling wave generated in the stator 6. It should be appreciated that the plurality of protrusions 12c is not necessarily provided in an alternative aspect.

As described above, the vibrator 12 is formed from appropriate metal. However, the vibrator 12 is not necessarily formed from metal. The vibrator 12 may be formed from another elastic body such as ceramics, a silicon material, or a synthetic resin. However, the vibrator 12 is preferably formed from metal. Accordingly, since the vibrator 12 can be electrically connected to ground potential, the wiring can be simplified.

Figure 9:
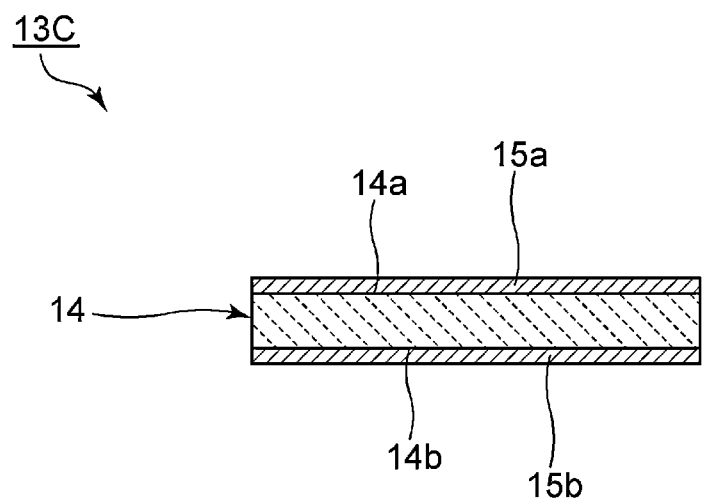
FIG. 9 is a front sectional view of the third piezoelectric element according to the first exemplary embodiment.

FIG. 9 is a front sectional view of the third piezoelectric element according to the first embodiment.

The third piezoelectric element 13C includes a piezoelectric material 14. The piezoelectric material 14 includes a third main surface 14a and a fourth main surface 14b. The third main surface 14a and the fourth main surface 14b face each other. The third piezoelectric element 13C includes a first electrode 15a and a second electrode 15b. The first electrode 15a is provided on the third main surface 14a of the piezoelectric material 14, and the second electrode 15b is provided on the fourth main surface 14b. In general, it is noted that the first piezoelectric element 13A, the second piezoelectric element 13B, and the fourth piezoelectric element 13D are formed similarly to the third piezoelectric element 13C.

Next, a method for driving the ultrasonic motor 1 will be described.

Figure 10:
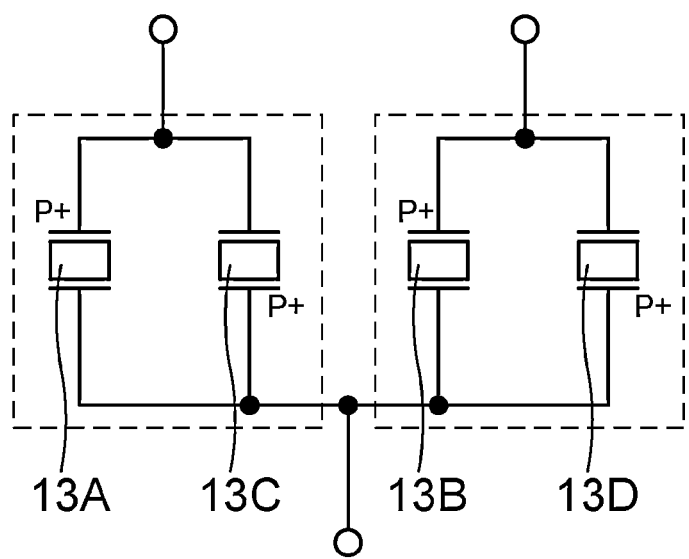
FIG. 10 is a circuit diagram used for describing a circuit that applies drive signals to piezoelectric elements in the first exemplary embodiment.

First and second signals are applied to the first and third piezoelectric elements 13A and 13C and the second and fourth piezoelectric elements 13B and 13D, respectively, using a drive circuit illustrated in FIG. 10.

Note that structure in which the plurality of the piezoelectric elements is dispersedly arranged in the circumferential direction and driven so that a traveling wave is generated in the stator 6 is disclosed in, for example, WO 2010/061508 A1. The structure in which a traveling wave is generated is not limited to the following description, and the configuration described in WO 2010/061508 A1 is incorporated by reference in the present specification, and thus the detailed description is omitted.

Figure 11A:
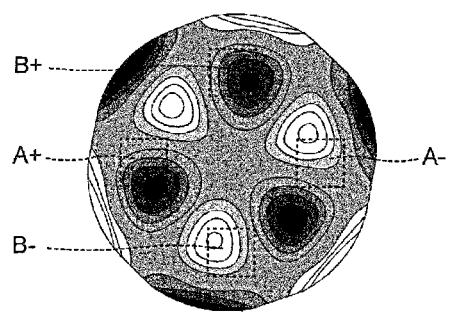
FIGS. 11(a) to 11(c) are schematic bottom views of the stator used for describing a traveling wave that is excited in the first exemplary embodiment.
Figure 11B:
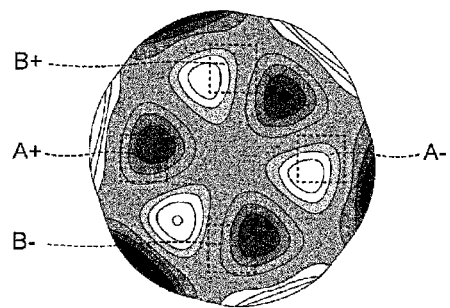
Figure 11C:
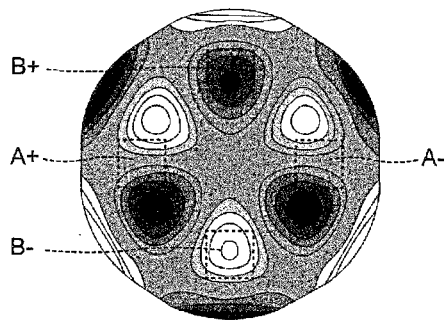

FIGS. 11(a) to 11(c) are schematic bottom views used for describing the above traveling wave in a more easily understandable manner. In grayscales of FIGS. 11(a) to 11(c), stress in one direction is greater toward black, and stress in the other direction is greater toward white. FIG. 11(a) indicates a three-wave standing wave X, and FIG. 11(b) indicates a three-wave standing wave Y. It is assumed that the first to fourth piezoelectric elements 13A to 13D are arranged such that they are separated at intervals of a central angle of 30°. It is also assumed that each of the piezoelectric elements has a dimension in the circumferential direction that occupies a central angle of 60°. In this case, since three-wave standing waves X and Y are excited, a central angle with respect to the wavelength of a traveling wave is 120°. That is, each of the first to fourth piezoelectric elements 13A to 13D has a dimension in the circumferential direction that corresponds to a central angle of 120°/2=60°. Adjacent piezoelectric elements are separated at intervals that correspond to a central angle of 120°/4=30°. In this case, as described above, the three-wave standing waves X and Y that are out of phase with each other by 90° are excited, and the three-wave standing waves X and Y are combined to generate a traveling wave illustrated in FIG. 11(c).

In FIGS. 11(a) to 11(c), "A+", "A−", "B+", and "B−" indicate polarization directions of the piezoelectric material 14. In particular, "+" indicates that the piezoelectric material is polarized from the third main surface 14a toward the fourth main surface 14b in the thickness direction and "−" indicates that the piezoelectric material is polarized in the opposite direction. Moreover, "A" indicates the first piezoelectric element 13A and the third piezoelectric element 13C, and "B" indicates the second piezoelectric element 13B and the fourth piezoelectric element 13D.

Note that, although an example of a three-wave case has been described, the present invention is not limited thereto, and similarly, in a nine-wave case, two standing waves that are out of phase with each other by 90° are excited, and a traveling wave is generated by the two standing waves being combined.

By a traveling wave traveling in the circumferential direction being generated in the vibrator 12 as described above, the rotor 4 in pressure contact with the second main surface 12b of the vibrator 12 is rotated centering around the axial direction Z.

It is also noted that in the present invention, the configuration in which a traveling wave is generated is not limited to the configuration illustrated in FIG. 11, and various conventionally known configurations in which a traveling wave is generated can be used.

Figure 12:
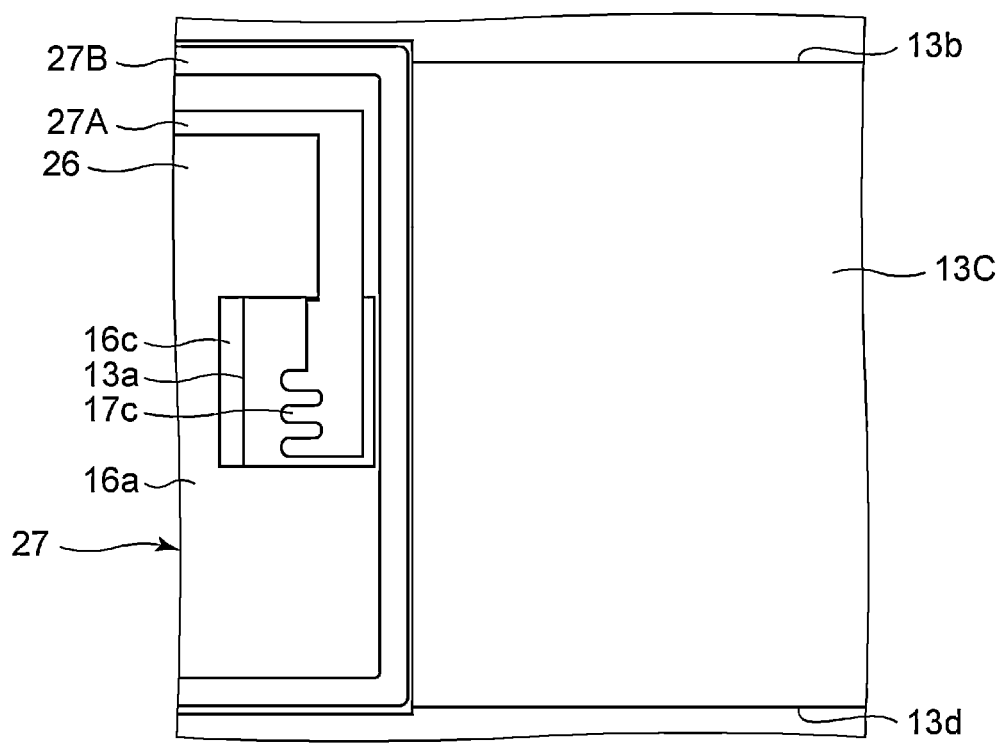
FIG. 12 is a plan view illustrating the vicinity of the third piezoelectric element in a first modification of the first exemplary embodiment without the insulating cover.

FIG. 12 is a plan view illustrating the vicinity of the third piezoelectric element in a first modification of the first exemplary embodiment without the insulating cover.

As shown in this modification, the routing of first wiring 27A and second wiring 27B in the vicinity of the third piezoelectric element 13C and the placement of an insulating substrate 26 are different. More specifically, the insulating substrate 26 covers the second side 13b and the fourth side 13d of the third piezoelectric element 13C. When viewed from the axial direction Z, the second wiring 27B overlaps with the second side 13b and the fourth side 13d of the third piezoelectric element 13C. A part of the first wiring 27A extends substantially parallel to the first side 13a of the third piezoelectric element 13C.

In the present modification, similarly to the first embodiment, wiring can be routed by a wiring member 27 in which the wiring is in a single layer. Accordingly, the vibration efficiency of the vibrator 12 can be improved, and the rotation efficiency of the ultrasonic motor can be improved. Furthermore, an adhesive between the first wiring 27A and the third piezoelectric element 13C can be easily discharged, and thus stress concentration on a lump of the adhesive due to a temperature change hardly occurs.

In addition, in the present modification, since the bonding area between the third piezoelectric element 13C and the insulating substrate 26 can be increased, the bonding strength between the third piezoelectric element 13C and the insulating substrate 26 can be increased.

As illustrated in FIG. 7, in the first embodiment, the wiring member 7 is vertically bent at a portion where the wiring member 7 extends from the first main surface 12a of the vibrator 12 to the third piezoelectric element 13C. Therefore, in this portion, the wiring member 7 extends in the normal direction of the first main surface 12a. Similarly, the wiring member 7 is vertically bent also in a portion where the wiring member 7 extends from the first main surface 12a to each piezoelectric element other than the third piezoelectric element 13C. However, the configuration of the portion where the wiring member 7 extends to each piezoelectric element is not limited to the above.

Figure 13:
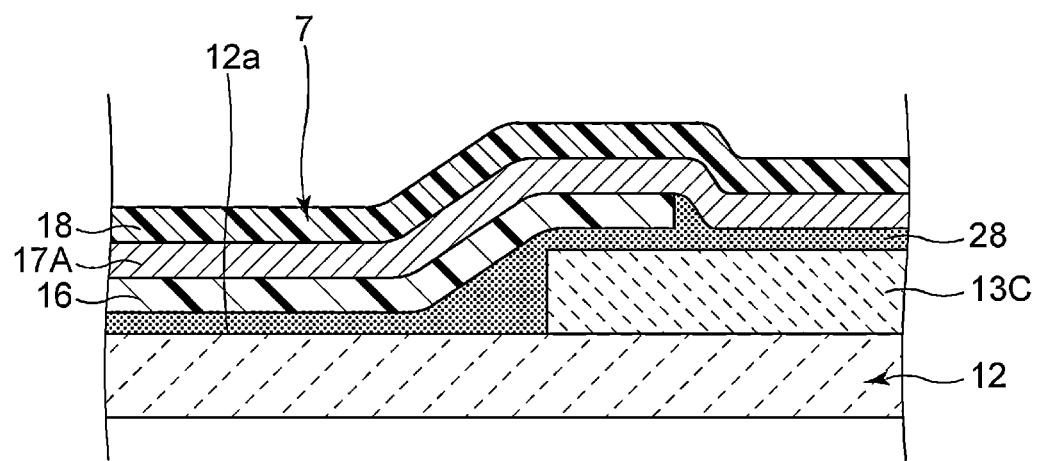
FIG. 13 is a schematic sectional view illustrating the vicinity of the third piezoelectric element in a second modification of the first exemplary embodiment.

FIG. 13 is a schematic sectional view illustrating the vicinity of the third piezoelectric element in a second modification of the first exemplary embodiment.

In the present modification, the wiring member 7 extends obliquely with respect to the normal direction of the first main surface 12a at a portion where the wiring member 7 extends from the first main surface 12a of the vibrator 12 to the third piezoelectric element 13C. This is due to the configuration of an adhesive layer 28 in the present modification. Specifically, the adhesive layer 28 is provided from the first main surface 12a of the vibrator 12 over the third piezoelectric element 13C. In a portion where the adhesive layer 28 extends from the first main surface 12a to the third piezoelectric element 13C, the thickness of the adhesive layer 28 increases toward the third piezoelectric element 13C. The wiring member 7 is provided on the adhesive layer 28. Accordingly, the wiring member 7 extends obliquely along the shape of the adhesive layer 28. As described above, the wiring member 7 is prevented from being bent steeply. Therefore, the wiring member 7 is hardly disconnected due to this configuration.

The wiring member 7 may extend obliquely with respect to the normal direction of the first main surface 12a also at portions where the wiring member 7 extends from the first main surface 12a of the vibrator 12 to piezoelectric elements other than the third piezoelectric element 13C. Accordingly, this configuration minimizes the wiring member 7 from being disconnected. Note that, similarly to the first embodiment, for example, an epoxy resin, a polyethylene resin, or the like can be used for the adhesive layer 28.

In the present modification, similarly to the first embodiment, wiring can be routed by the wiring member 7 in which the wiring is in a single layer. Accordingly, the vibration efficiency of the vibrator 12 is improved, and the rotation efficiency of the ultrasonic motor is also improved.

DESCRIPTION OF REFERENCE SYMBOLS

1: Ultrasonic motor
2: Case
2A, 2B: First and second case members
2a: Recessed portion
2b to 2d: Through hole
2e: Cylindrical protruding portion
3: Bearing
4: Rotor
4a: Rotor body
4b: Rotating shaft
5: Friction material
6: Stator
7: Wiring member
8: Pressure spring
9: Connector
12: Vibrator
12a, 12b: First and second main surfaces
12c: Protrusion
12d: Through hole
13A to 13D: First to fourth piezoelectric elements
13a to 13d: First to fourth sides
14: Piezoelectric material
14a, 14b: Third and fourth main surfaces
15a, 15b: First and second electrodes
16: Insulating substrate
16a, 16b: First and second substrate main surfaces
16c: Cavity
17A, 17B: First and second wiring
17C: Ground wiring
17a to 17d: First to fourth comb-shaped portions
18: Insulating cover
18a: Cutout portion
26: Insulating substrate
27: Wiring member
27A, 27B: First and second wiring
28: Adhesive layer

The invention claimed is:
1. An ultrasonic motor comprising:
a stator including a plate-shaped vibrator having first and second main surfaces that oppose each other, and a plurality of piezoelectric elements disposed on the first main surface of the plate-shaped vibrator;
a rotor in direct or indirect contact with the second main surface of the plate-shaped vibrator; and
a wiring member including an insulating substrate disposed on the first main surface of the plate-shaped vibrator, and first wiring and second wiring disposed on the insulating substrate,
wherein the plurality of piezoelectric elements is dispersedly arranged along a circumferential direction of a traveling wave that circulates an axial direction of the plate-shaped vibrator so that the traveling wave is generated by the plate-shaped vibrator,
wherein the plurality of the piezoelectric elements includes a first piezoelectric element, a second piezoelectric element, a third piezoelectric element, and a fourth piezoelectric element, and when viewed from the axial direction, the first and third piezoelectric elements face each other across a center of the traveling wave, and the second and fourth piezoelectric elements face each other across the center of the traveling wave,
wherein the first wiring of the wiring member is electrically connected to the first and third piezoelectric elements, and the second wiring is electrically connected to the second and fourth piezoelectric elements, and
wherein, when viewed from the axial direction, the second wiring passes over the third piezoelectric element from the second piezoelectric element side and extends toward the fourth piezoelectric element side.

2. The ultrasonic motor according to claim 1, wherein the plate-shaped vibrator is a metal plate that is disk shaped.

3. The ultrasonic motor according to claim 1, wherein the axial direction of the plate-shaped vibrator is a direction that connects the first main surface to the second main surface of the plate-shaped vibrator and that extends along a rotation center thereof.

4. The ultrasonic motor according to claim 1, wherein:
when viewed from the axial direction, the insulating substrate of the wiring member includes a cavity positioned on the third piezoelectric element, and
a portion of the first wiring connected to the third piezoelectric element is disposed in the cavity of the insulating substrate.

5. The ultrasonic motor according to claim 4, wherein a part of an outer peripheral edge of the third piezoelectric element is positioned in the cavity.

6. The ultrasonic motor according to claim 5, wherein the wiring member includes an insulating cover that covers the first wiring and the second wiring.

7. The ultrasonic motor according to claim 6, wherein the insulating cover includes a cutout portion that, when viewed from the axial direction, is positioned on an inner side of the cavity of the insulating substrate and surrounds a portion of the first wiring connected to the third piezoelectric element.

8. The ultrasonic motor according to claim 1, wherein the wiring member includes an insulating cover that covers the first wiring and the second wiring.

9. The ultrasonic motor according to claim 1, wherein at least one of a portion of the first wiring connected to the first piezoelectric element, a portion of the first wiring connected to the third piezoelectric element, a portion of the second wiring connected to the second piezoelectric element, or a portion of the second wiring connected to the fourth piezoelectric element includes a comb-shaped portion.

10. The ultrasonic motor according to claim 1, wherein a portion of the first wiring connected to the third piezoelectric element includes a comb-shaped portion that is comb-shaped and faces an outer peripheral edge of the third piezoelectric element.

11. The ultrasonic motor according to claim 1, wherein the second wiring overlaps the third piezoelectric element in a plan view of the plate-shaped vibrator.

12. The ultrasonic motor according to claim 1, further comprising an adhesive layer disposed on the first main surface of the plate-shaped vibrator and the third piezoelectric element, such that a thickness of the adhesive layer increases as the adhesive layer extends toward the third piezoelectric element.

13. The ultrasonic motor according to claim 12, wherein the wiring member extends obliquely along a shape of the adhesive layer, such that the wiring member is configured to not disconnect.

14. The ultrasonic motor according to claim 1, further comprising a plurality of protrusions disposed on the second main surface of the plate-shaped vibrator and in contact with the rotor.

15. An ultrasonic motor comprising:
a stator including a plate-shaped vibrator having first and second main surfaces that oppose each other, and a plurality of piezoelectric elements disposed on the first main surface of the plate-shaped vibrator;
a rotor coupled to the second main surface of the plate-shaped vibrator; and
a wiring member including an insulating substrate disposed on the first main surface of the plate-shaped vibrator, and first wiring and second wiring disposed on the insulating substrate,
wherein the plurality of piezoelectric elements is dispersedly arranged in a circumferential direction of the plate-shaped vibrator and includes first to fourth piezoelectric elements, with the first and third piezoelectric elements facing each other across a center of the plate-shaped vibrator, and the second and fourth piezoelectric elements facing each other across the center of the plate-shaped vibrator,
wherein the first wiring of the wiring member is electrically connected to the first and third piezoelectric elements, and the second wiring is electrically connected to the second and fourth piezoelectric elements, and
wherein the second wiring passes over the third piezoelectric element from the second piezoelectric element side in a plan view of the first main surface of the plate-shaped vibrator.

16. The ultrasonic motor according to claim 15, wherein the second wiring extends toward the fourth piezoelectric element side.

17. The ultrasonic motor according to claim 15, wherein the rotor is indirectly coupled to the second main surface of the plate-shaped vibrator.

18. The ultrasonic motor according to claim 15, wherein the plurality of piezoelectric elements are arranged along a circumferential direction of a traveling wave that circulates an axial direction of the plate-shaped vibrator so that the traveling wave is generated by the plate-shaped vibrator during vibration.

19. The ultrasonic motor according to claim 18, wherein the axial direction of the plate-shaped vibrator is a direction that connects the first main surface to the second main surface of the plate-shaped vibrator and that extends along a rotation center thereof.

20. The ultrasonic motor according to claim 16, wherein: when viewed from the plan view of the first main surface of the plate-shaped vibrator, the insulating substrate of the wiring member includes a cavity positioned on the third piezoelectric element, a portion of the first wiring connected to the third piezoelectric element is disposed in the cavity of the insulating substrate, and a part of an outer peripheral edge of the third piezoelectric element is positioned in the cavity.

* * * * *